United States Patent [19]

Smith

[11] 3,841,719
[45] Oct. 15, 1974

[54] SELF-CONTAINED VARIABLE FLUID BEARING FOR SKIDDING HEAVY LOADS

[76] Inventor: George Rogers Smith, 3101 Lake Villa Dr., Metaririe, La. 70002

[22] Filed: June 21, 1972

[21] Appl. No.: 265,087

[52] U.S. Cl. .................................... 308/5, 308/9
[51] Int. Cl. ........................................ F16c 21/00
[58] Field of Search ......... 180/125, 127; 308/5, 122

[56] References Cited
UNITED STATES PATENTS

| | | | |
|---|---|---|---|
| 3,104,496 | 9/1963 | Macks | 180/125 |
| 3,257,964 | 6/1966 | Conners | 180/125 |
| 3,277,696 | 10/1966 | Gertel | 308/5 R |
| 3,499,690 | 3/1970 | Siebers | 308/5 R |
| 3,513,934 | 5/1970 | Crowley | 308/122 |
| 3,610,365 | 10/1971 | Maddox | 308/5 R |
| 3,711,167 | 1/1973 | Ennis | 308/5 R |

Primary Examiner—Charles J. Myhre
Assistant Examiner—R. H. Lazarus
Attorney, Agent, or Firm—James B. Lake, Jr.

[57] ABSTRACT

Relatively movable upper and lower skid plates, the upper skid plate for carrying a load and having depending sides and ends of which the upper is supported on the lower skid plate between upwardly extending side flanges which act as guides in relative motion therebetween. Antifriction compression seals are partially recessed in the free edges of the sides and ends of the upper side plate and extend downward in continuation thereof for sealing the ends and sides with the lower skid plate when a load is placed on the upper skid plate. A divider with similar seals is provided in the upper skid plate intermediate the closed ends for dividing a space defined between the plates. Pressure fluid is introduced into the spaces for raising the upper skid plate and load an amount less than the seals were compressed so as not to break the sealing. The upper skid plate and load when so raised is readily movable on the lower skid plate, the friction therebetween comprising practially entirely that between fluid and plates and a minor amount between the antifriction seals and the lower skid plate. The skid plates and pressure fluid therebetween comprises a self-contained fluid bearing, variable according to relative movement and position of said skid plates.

3 Claims, 3 Drawing Figures

PATENTED OCT 15 1974  3,841,719

SELF-CONTAINED VARIABLE FLUID BEARING FOR SKIDDING HEAVY LOADS

The invention relates generally to skidding devices and more particularly to apparatus for and method of skidding extremely heavy objects.

Air bearings are old in the art for reducing skidding friction between contact surfaces of separate masses, one of which is relatively light. Some of the prior art teaches a stationary plate supporting and skidding light articles along the length of said plate by directional jets mounted and functioning therein. Other prior art teach plates on which intermediately heavy articles are carried, the load-carrying plate and load being raised and moved by directional jets mounted and functioning in the load-carrying plate and directed downward against supporting ground or structure. Only one case was found teaching a vertically-spaced pair of skid plates, the lower plate defining a triangular track in which jet orifices are defined, and the upper plate having a triangular carriage adapted to engage over said track and supported thereabove by said jets to carry a load.

It is an object of the invention to provide a self-contained fluid bearing for carrying a load and for reducing skidding friction in moving the load.

Another object of the invention is to provide an enclosure for pressure fluid with the top of the container defining an upper skid plate, relatively movable with respect to the bottom of said container defining a bottom skid plate, the upper and lower skid plates being in operating contact through pressure fluid.

A further object of the invention is to provide compression seals between upper and lower skid plates which in combination with pressure fluid therebetween provides a practically frictionless bearing between the load and a surface over which said load is moved.

Other objects and a more complete understanding of the invention may be had by referring to the following specifications, claims and drawings in which:

Figure 1:
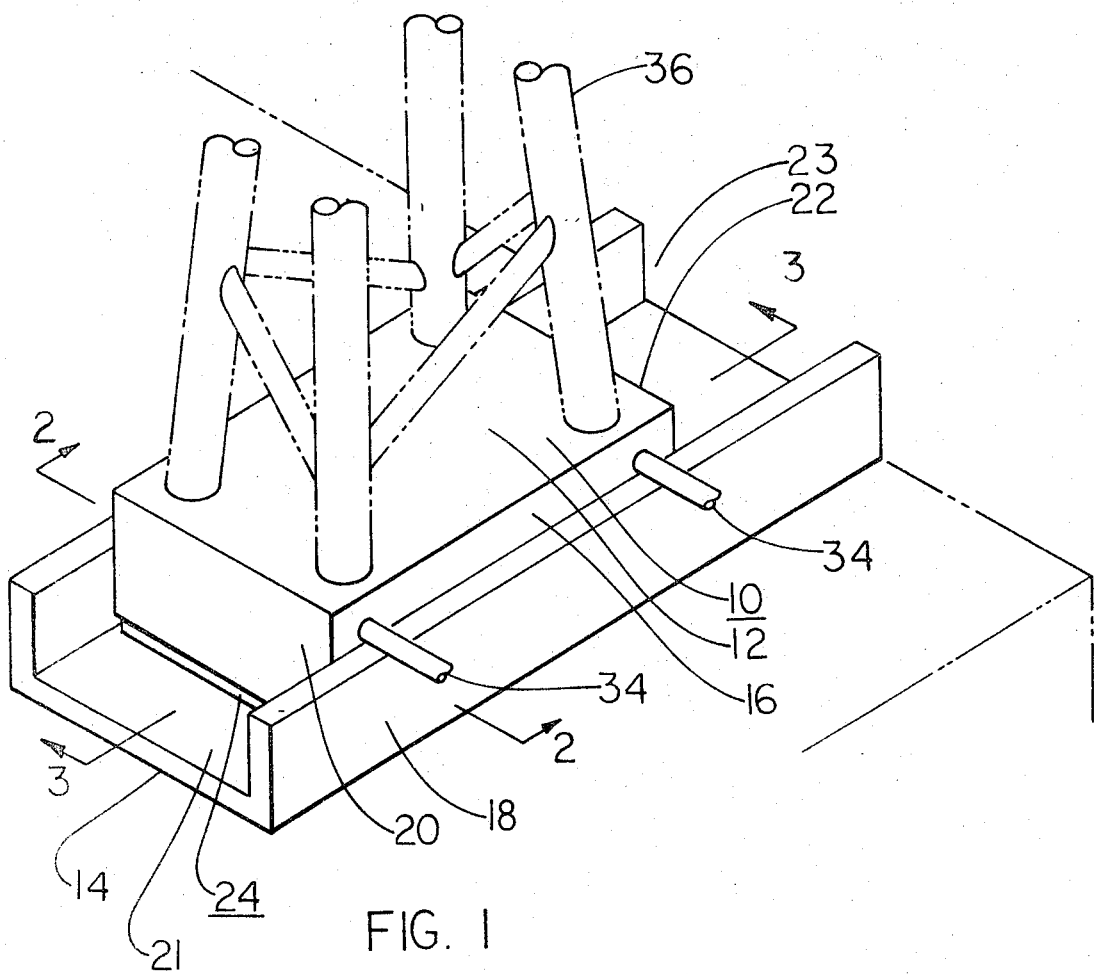
FIG. 1 is a three-dimensional view of the invention installed on a base for moving a jacket of a fixed offshore drill rig.
Figure 2:
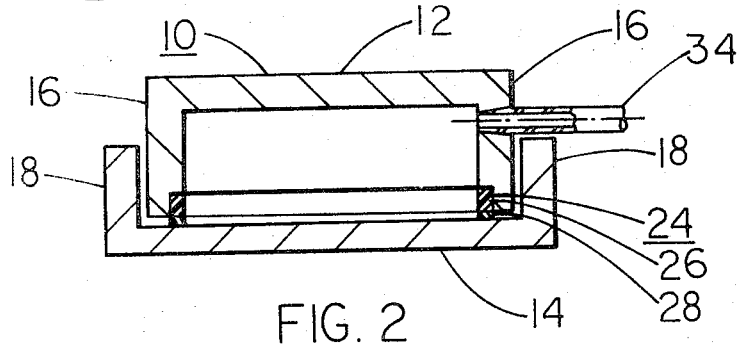
FIG. 2 is an enlarged cross sectional-view taken along section line 2—2 of FIG. 1.
Figure 3:
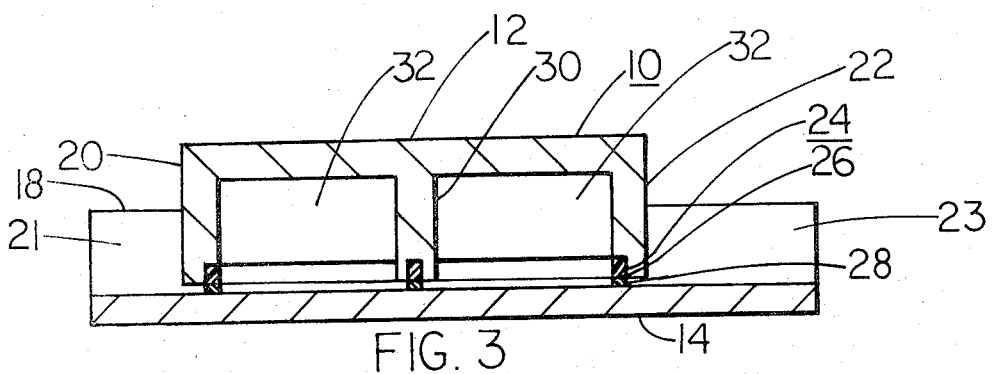
FIG. 3 is an enlarged cross-sectional view taken along section line 3—3 of FIG. 1.

Referring to FIGS. 1–3, the invention 10 comprises an upper skid plate 12 and a longer lower skid plate 14. Upper skid plate 12 has depending sides 16 that are adapted to fit between upwardly extending guide flanges 18 of lower skid plate 14. Skid plate 12 also has closed following and leading ends 20 and 22 respectively, and skid plate 14 has open following and leading ends 21 and 23.

Composite antifriction and compression seals 24 are recessed in the free edges of sides 16 and ends 20 and 22 to extend equally therebeyond a convenient length for compressive sealing. A compressive element 26 of the seal 24 has an antifriction element 28 joined to the external end thereof. A transverse divider 30 mounted in the upper skid plate divides the space between skid plates 12 and 14 into leading and following chambers 32, that are shown equal in FIG. 3 by may differ according to weight distribution of a load on upper skid plate 12. A seal 24 is recessed into the free edge of said divider 30 for sealing chambers 32 from each other.

Individually controlled pressure fluid intakes 34 are defined in each chamber 32 and are supplied from external sources (not shown) sufficiently with pressure fluid to raise upper skid plate 12 and a load 36 with respect to lower skid plate 14 within limits of expansion of compression element 26 in order that antifriction element 28 remains in contact with lower skid plate 14 biased thereon only by residual expansion force of compression element 26. A low coefficient of friction elastic material such as "teflon" may be used as a single unit seal rather than the composite seal of FIGS. 2 and 3. The skidding device is thus a self-contained fluid bearing providing in its container a load bearer and its own initial bearing surfaces as well as confining pressure fluid necessary to form a fluid bearing.

Contemplated uses of the invention are to move extremely heavy equipment such as oil well jackets into water, and ships from ways. An operation of the former will be described.

A load 36, partially shown in FIG. 1, comprises a jacket for a fixed oil rig placed on the upper skid plate 12, thereby compressing seals 24 flush with free edges of sides 16, ends 20 and 22, and divider 30. Pressure fluid from an external source (not shown) is admitted through pressure inlets 34 to space between skid plates 12 and 14, forcing them apart for a distance less than compression of seals 24 and thereby leaving them in sealing contact with lower skid plate 14, but biased only by residual expansion of said seals. The load is then supported by the fluid bearing 10 on a base that could be a barge in this case. Comparative gentle pressure is all that is required to move the load, the friction being almost entirely fluid, the rest being only that between antifriction element of the seals and lower skid plate 14. As closed end 24 clears lower skid plate 14, pressure fluid to leading chamber 32 is cut off and the upper skid plate tilts forward, but not sufficiently to break the seals of the following chamber 32. If necessary pressure fluid to said following chamber 32 can be increased to bear the increased load on that area. As the forward movement continues, upper skid plate 12 tilts downwardly more and more until all sealing is broken and all fluid pressure is cutoff. At this point the jacket slides feet first into water with the upper skid plate 12, which can be secured to the lower skid plate by any convenient means, such as a line, for recovery and remounting on the lower skid plate.

What is claimed is:

1. A self-contained variable fluid bearing for skidding heavy loads comprising: an upper skid plate with depending sides, ends, and a transverse divider, intermediate said ends, which in combination define a pair of bottom-opening pair of longitudinally aligned enclosures with depending free ends and oppositely disposed load supporting surface; a lower skid plate adapted to supportively engage said depending free edges and extend normal therebeyond for supporting said upper skid plate in relative longitudinal movement therebetween, and to define therewith longitudinally aligned closed chambers therebetween, said lower skid plate having upwardly extending sides spaced transversely apart and adapted to guide said upper skid plate in said longitudinally relative movement; antifrictional and compressible sealing means recessed in the free edges of said enclosures to reduce sliding friction between said skidplates, and to compress under a load to seal each of said longitudinally aligned chambers independently of each other for maintaining sealing in one of said chambers when said upper skid plate is longitudinally moved less than said transverse divider beyond said lower skid plate; and input means for introducing pressure fluid in each of said closed chambers to vertically raise said upper skid plate with respect to the lower skid plate less than the compression of said sealing means by said load for simultaneously maintaining sealing while reducing the force of said load and hence the friction between the meeting and supporting parts.

2. A self-contained fluid bearing as described in claim 1 wherein said sealing means comprises a composite means having an inner recessed compressible part and an outer antifriction part.

3. A self-contained fluid bearing as described in claim 1 wherein said sealing means comprises a unitary means that is both compressible and antifrictional.

* * * * *